(12) United States Patent
Zimmer (10) Patent No.: US 7,204,184 B2
(45) Date of Patent: Apr. 17, 2007

(54) GUIDE SYSTEM WITH PNEUMATIC STOP FOR A MOVABLE COMPONENT

(76) Inventor: Herbert Zimmer, Hauptstrasse 74, 77886 Lauf (DE)

( * ) Notice: Subject to any disclaimer, the term of this patent is extended or adjusted under 35 U.S.C. 154(b) by 0 days.

(21) Appl. No.: 11/168,036

(22) Filed: Jun. 28, 2005

(65) Prior Publication Data
US 2005/0235823 A1 Oct. 27, 2005

Related U.S. Application Data

(63) Continuation-in-part of application No. PCT/DE03/00022, filed on Jan. 3, 2003.

(51) Int. Cl.
*F16F 9/48* (2006.01)
*F16F 9/02* (2006.01)

(52) U.S. Cl. .......... 91/405; 92/85 B; 92/169.1

(58) Field of Classification Search .......... 91/399, 91/405; 92/85 B, 134, 169.1, 185, 240
See application file for complete search history.

(56) References Cited

U.S. PATENT DOCUMENTS

| | | | | |
|---|---|---|---|---|
| 4,048,905 A | * | 9/1977 | Souslin | 92/85 B |
| 4,376,472 A | * | 3/1983 | Heyer et al. | 92/248 |
| 5,074,389 A | * | 12/1991 | Slocum | 188/277 |
| 5,884,734 A | * | 3/1999 | Hiramoto et al. | 277/345 |
| 5,887,857 A | * | 3/1999 | Perrin | 267/124 |
| 6,186,512 B1 | * | 2/2001 | Deppert et al. | 277/434 |
| 6,481,336 B2 | * | 11/2002 | May | 92/185 |
| 6,957,807 B2 | * | 10/2005 | Zimmer et al. | 267/139 |

FOREIGN PATENT DOCUMENTS

DE 29521002 U1 * 6/1996
WO WO 2004061327 A1 * 7/2004

* cited by examiner

*Primary Examiner*—Thomas E. Lazo
(74) *Attorney, Agent, or Firm*—Klaus J. Bach (57) ABSTRACT

In a guide system with a pneumatic stop structure comprising a cylinder with a piston including a piston seal element movably disposed in the cylinder and a piston rod connected to the piston and extending from the cylinder wherein a displacement chamber is formed at one side of the piston, the cylinder has a cross-section which steadily increases toward the end of the displacement chamber and the piston seal element which, in the area of the smallest cylinder cross-section is in sealing engagement with the cylinder wall is out of sealing contact with the cylinder wall at the opposite end of the cylinder where the cylinder has an increased diameter.

13 Claims, 6 Drawing Sheets

GUIDE SYSTEM WITH PNEUMATIC STOP FOR A MOVABLE COMPONENT

This is a Continuation-In-Part Application of International Application PCT/DE03/00022 filed 3 Jan. 2003 and designating the US.

BACKGROUND OF THE INVENTION

The invention relates to a guide system with a pneumatic stop for a movable component, including a cylinder and a piston axially movably disposed in the cylinder and a piston rod subjected to internal and external forces. The piston is provided with a seal element and defines with the cylinder a displacement chamber with a leakage flow which is dependent on the direction of the piston movement in the cylinder and the position of the piston in the cylinder. In the end position of the piston opposite the displacement chamber the piston seal element abuts the inner cylinder wall for sealing engagement therewith in a pressure free state.

Drawers or doors and other components are guided so as to be movable along geometrically predetermined pathways of limited length. They are moved by external and internal forces.

The internal forces are released by potential energy storage devices whose energy content is position or tension dependent. Energy released from the storage devices is returned to the storage devices when the component is returned to its original position. Such energy storage devices are for example gravity potentials or spring potentials. Over the given closed path of movement, any expanded energy is regained.

The external forces are provided for example by an operator.

When for example a drawer approaches its closed end position, the moving masses thereof are decelerated for example by a retarding structure in order to avoid damage to the guide components and the guided components and to reduce or eliminate noises such as the clattering of silverware disposed in the drawer.

In order to decelerate the moving mass a pneumatic cylinder piston unit is provided which comprises a displacement chamber which is delimited by a piston and from which air is throttled to the ambient.

Such an arrangement is known, for example, from DE 100 21 762 A1. It discloses a retarding structure wherein air is discharged from a cylinder upon introduction of the piston via a channel extending through the piston. With this arrangement, the retardation is constant over the piston stroke. Depending on the energy applied, the piston stops before reaching its end position or, upon reaching its end position, it is moved back to some degree because of the spring properties of the compressed air still present in the cylinder.

It is the object of the present invention to provide a reliable guide system with a pneumatic stop for a movable component which causes the component to remain at a standstill at an end position thereof without rebound or hard impact.

SUMMARY OF THE INVENTION

In a guide system with a pneumatic stop structure comprising a cylinder with a piston including a piston seal element movably disposed in the cylinder and a piston rod connected to the piston and extending from the cylinder in which a displacement chamber is formed with the cylinder at one side of the piston, the cylinder has a cross-section which steadily increases toward the end of the displacement chamber remote from the piston and the piston seal element which, in the area of the smallest cylinder cross-section, is in sealing engagement with the cylinder wall is out of sealing contact with the cylinder wall at the opposite end of the cylinder.

Upon fast inward movement of the piston into the cylinder, the air in the cylinder chamber is compressed. The pressure in the cylinder chamber is increased thereby generating a force on the piston in a direction opposing the stroke movement of the piston which retards the movement of the piston.

With the compression of the air in the cylinder, the seal is biased into sealing contact with the cylinder wall.

With increasing piston travel into the cylinder, the piston reaches the widening cylinder area. At the beginning of the piston stroke, the outer diameter of the seal element of the piston follows the cylinder cross-section. When the piston approaches its end position in the piston compression chamber, the piston seal element can no longer follow the cylinder walls because of the widening of the cylinder in this area. The seal effect along the cylinder wall deteriorates and the air compressed in the cylinder chamber escapes past the piston seal. As a result, the air pressure in the cylinder compression chamber drops to ambient pressure. The seal element is no longer subjected to compression force of the air and assumes its original position around the piston. With the remaining momentum, the drawer reaches its end position with little impact or stops, for example, within a few millimeters from the end position.

The guide system operates reliably over a long period. When the piston is again moved out of the cylinder, ambient air flows into the cylinder past the piston possibly by deforming the seal element. There is therefore little retardation during the outward movement of the piston.

Such movement retardations can be provided for the inward as well as the outward movements of a piston. The cylinder is then widened in each case in the direction of the retarding movement to be provided by the system.

At least in the surfaces of the piston seal element, which are in contact with the cylinder wall, compounds which are different from the seal material may be chemically bound to the seal material or physically introduced therein.

The compounds which are different from the seal material such as halogens which are introduced into the surface of the piston seal element prevent, among others, the piston seal element from adhering to the inner cylinder walls. The treated surface of the seal also prevents the seal structure from being damaged when passing over non-uniform areas of the cylinder wall. Furthermore, the piston seal element is easily released from the cylinder wall when the piston reaches the larger diameter cylinder area. The change of the piston retardation in this area is therefore reliably repeatable.

The piston seal element may also be halogenized over its whole surface area. In this way an adhering of the piston seal element to the piston is also prevented.

The cylinder chamber may be widened toward one end for example in a truncated cone-like fashion; the cone inclination may be for example 1:5 to 1:250. Axially extending grooves may also be formed into the cylinder walls by which the cross-section of the cylinder is additionally increased.

The invention together with particular features thereof will be described below in greater detail on the basis of the accompanying drawings.

DESCRIPTION OF PREFERRED EMBODIMENTS

Figure 1:
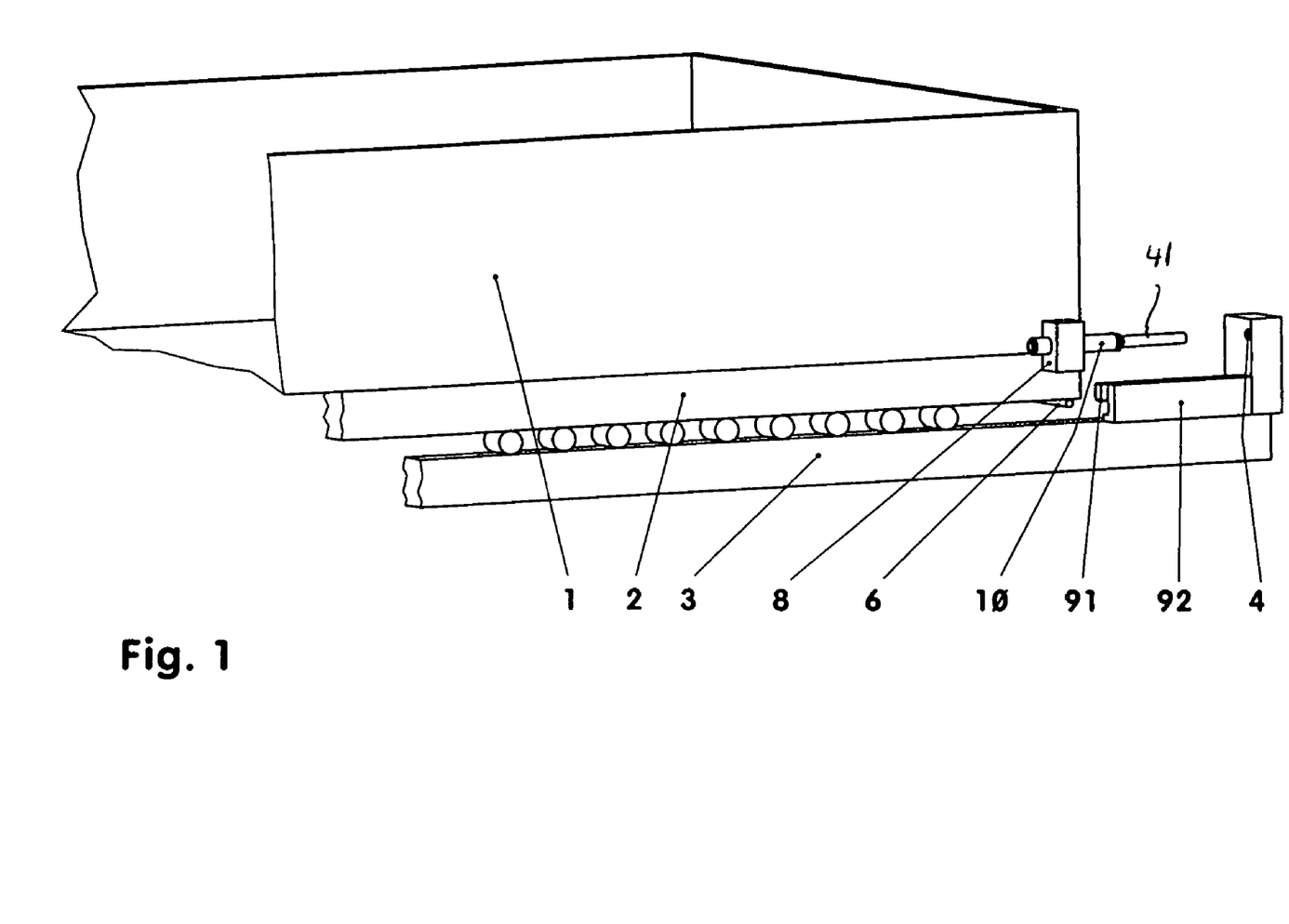
FIG. 1 shows a guide system with a retarding or stop structure for a movable component.
Figure 11:
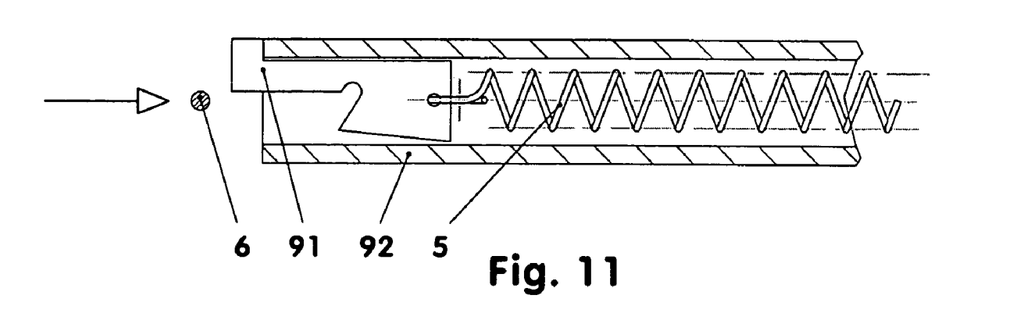
FIG. 11 shows the guide track for the movable component with a hook element in an engaged position.
Figure 12:
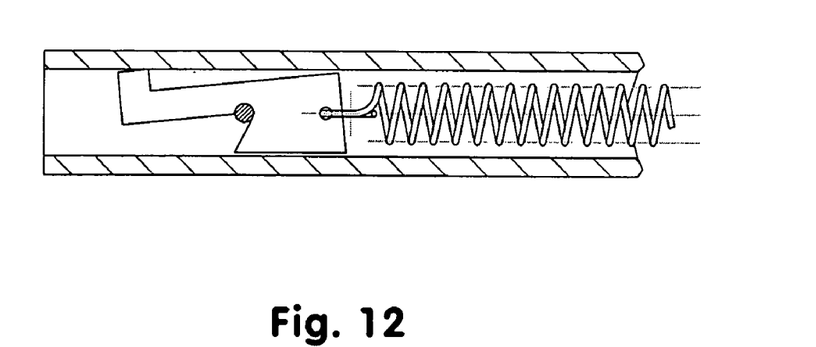
FIG. 12 shows the arrangement of FIG. 11 with the hook element disengaged.

FIG. 1 shows in a simplified manner one side of a guide arrangement for a drawer 1 with a pneumatic retarding or stop structure 10, the drawer being a part of a piece of furniture. The guide system as shown in FIG. 1 comprises support tracks 2, 3 with anti-friction bearing members disposed therebetween and for example a spring 5 (FIGS. 4, 12) with a hook 91 supported in a guide member 92, and a retarding or stop structure 10. In the position, as shown in FIG. 1, the drawer is in an intermediate position, that is, it is moved only halfway in. The retarding or stop structure 10 is attached to the drawer 1 for example a cylinder-piston unit including a piston rod 41, which is extended in this position so as to project beyond the end of the drawer 1. In FIGS. 11 and 12, the guide track 92 is shown with a spring 5 disposed therein. In FIG. 11, the spring 5 is shown as a tension spring in an expanded state so as to form an energy storage device. One end of the spring 5 is attached to the support track 3 or the track structure 92 while the other end is connected to the hook 91 which is engaged with the track structure 92.

When the drawer 1 is closed, the piston rod 41 engages, by means of a gripper element 12 disposed on the piston rod 41, a stop member 4 of the support track 3. Upon further closing of the drawer 1, a bolt 6 disposed for example at the bottom of the drawer 1 engages the hook 91 and moves it out of its engagement with the track structure 92. At this point, the hook 91 pivots for example around the bolt 6 and engages the bolt 6. At the same time, the hook 91 is disengaged from the track structure 92 so that the spring 5 pulls the bolt 6 and, together therewith, the drawer 1 further toward the closed position thereof (see FIG. 12). The movement of the drawer is stopped by the deceleration or stop structure 10.

Figure 2:
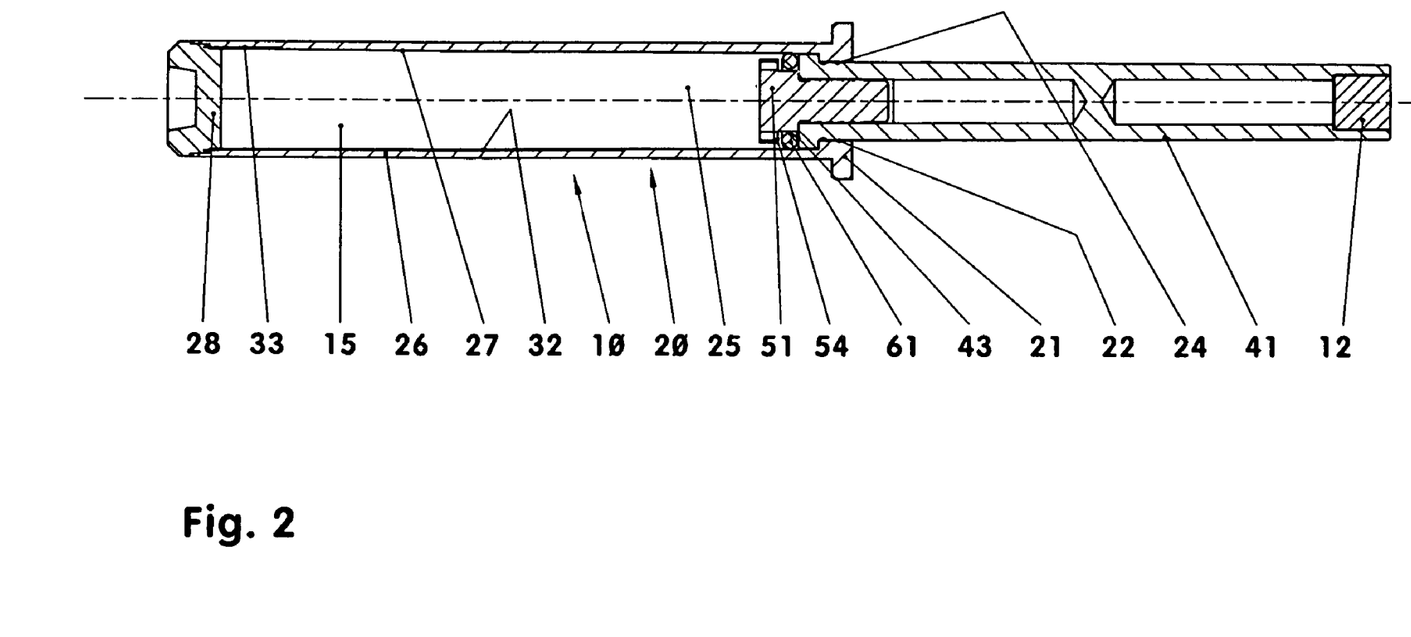
FIG. 2 shows the retarding or stop structure.

The stop structure 10, see FIG. 2 comprises a cylinder 20 in which a piston 51, 43, 54, 58 with a piston rod 41 and a piston seal element 61 is movably supported. The outer end of the piston rod 41 may carry the gripper element 12.

Figure 3:
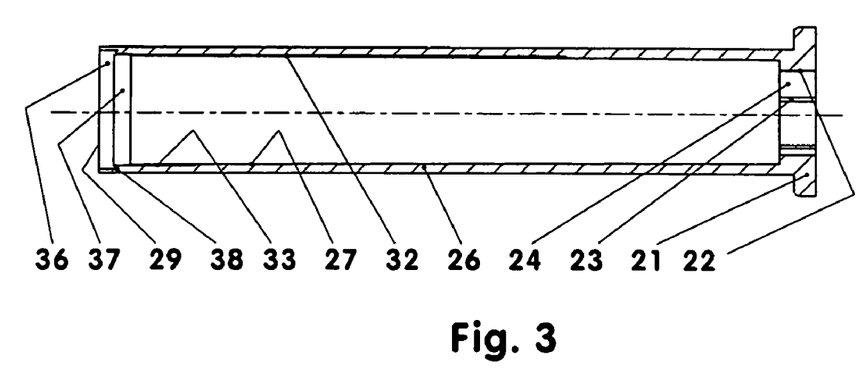
FIG. 3 shows the cylinder of the retarding or stop structure of FIG. 2.

The cylinder 20, see FIGS. 2, 3, consists of a sleeve 26, an end member 28 and a head member 21 which, in the present case is in the form of a flange 21.

FIG. 3 shows as cylinder a cylindrical sleeve 26 with the head member 21, which is manufactured in the present case as an injection molding part consisting of a thermoplastic material such as polyoximethylene. The length of the sleeve is about five and a half times its diameter. The cylindrical internal wall 27 has a non-cylindrical section which is for example in the form of a truncated cone. The smaller cross-sectional area of the truncated cone section is in the area of the head member 21 of the sleeve 26 which has a cross-sectional area of, for example, 100 mm². The inclination of the conical section of the sleeve 26 is about 1:140. The inner wall 27 may be polished. The minimum wall thickness of the cylindrical sleeve is about 6% of its outer diameter.

In this inner cylinder wall 27, furthermore a longitudinal groove 32 is provided. It has a length of about 70% of the length of the cylinder and ends at the inner end 29 of the cylinder sleeve 26. Its width is about 2% of the larger diameter of cylinder inside wall 27. The depth of the groove 32 is about one fourth of its width. It has a sharp edge at the inside wall 27. The groove end portion has an inclination of 45°. Instead of a single groove 32 several grooves 32 may be provided on the inner wall 27 of the sleeve. The grooves may also extend in a screw-like fashion along the inner surface of the cylindrical sleeve 26.

At the inner end 29, there is another longitudinal groove 33 formed into the cylinder wall 27. This longitudinal groove 33 which is displaced from the groove 32 by for example 180° may be twice as wide as the groove 32 and have a length of about 15% of the length of the cylinder. The depth of this groove 33 is about one eighths of its width. Also this groove 33 has sharp edges at the inner cylinder wall 27 and at its end has an end wall with an inclination of 45°.

For the installation of the end part 28, the sleeve end 29 includes a two stage recess 36, 37. The diameter of the smaller diameter recess 37 is about 90% of that of the larger diameter recess 36. For the displacement of air during the installation of the end part 28, the larger recess is provided with a cut-out 38. From the smaller diameter recess 37 the air can be displaced into the interior 25 of the cylinder 20.

The head part 21 includes a piston rod guide opening 22. This is a bore with longitudinally oriented webs or projections 23. The open bore diameter is about 75% of the larger inner diameter of the cylinder sleeve 26. Between the individual projections 23, whose height is for example 1% of the free bore diameter, passages 24 are formed when the piston rod is installed, see FIG. 2.

Figure 4:
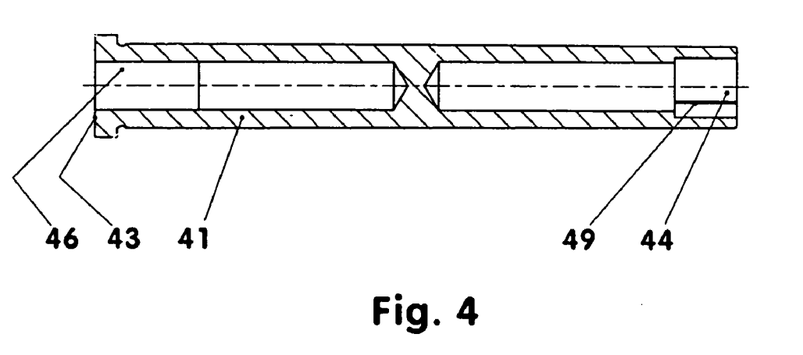
FIG. 4 shows the piston rod of the structure shown in FIG. 2.
Figure 5:
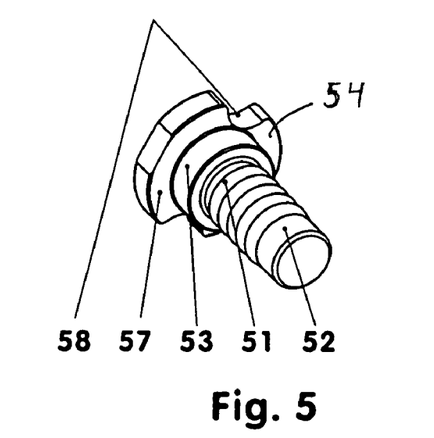
FIG. 5 shows the piston of the structure shown in FIG. 2.

FIG. 4 shows the piston rod 41 with part of the piston 43 formed thereon. The piston rod 41 which is for example cylindrical has the length of the cylinder 20, its diameter is about 75% of the larger diameter of the cylindrical sleeve 26 so that the piston rod when in installed is in contact with the projections 23 of the piston rod guide opening 22. The front end of the piston rod 41 remote from the piston which is shown in FIG. 4 on the right, has for example a mounting bore 44 for the gripper element 12 which may be magnet or another coupling member. For centering the gripper element 12, the mounting bore 44 has for example three web-like longitudinally extending projections 49 arranged displaced by 120° around its circumference. The other end of the piston rod 41 forms a piston support flange 43. The diameter of the support flange 43 is about 98% of the smaller inner diameter of the cylinder 20. Also, at the side of the support flange 43, the piston rod 41 is provided with an opening 46. The opening 46 is slightly conical and adapted to receive a piston part 51. The piston part 51 (see FIG. 5) has for example stepped diameter areas 52, 53. Upon installation, the piston part 51 is engaged in the opening 46 of the piston rod 41 via the insert area 52. The diameter of the adjacent cylindrical area 53 is about 60% of the smaller inner diameter of the cylinder 20; its length is about 35% of this diameter.

Adjacent the cylindrical area, there is a piston flange 54. The outer diameter of this piston flange 54 is about 98% of the smaller diameter of the cylinder 20. The piston flange 54 may be provided with grooves 58 extending down to the cylindrical area 53. Upon mounting of the piston part 51 onto the piston rod 41, the piston seal element 61 is disposed therebetween (see FIG. 2). The seal element is a seal ring whose diameter is larger than the diameter of the cylindrical area 33. Its diameter is at least as large as the smallest diameter of the cylinder 20. The seal ring 61 consists for example of nitrile butadiene rubber. Its surface is quasi-hardened. With this so-called hardening procedure halogens are introduced into the surface of the material. This surface treatment reduces the tendency of the piston seal element 61 to adhere to the inner cylinder wall 27 and to the piston 51, 43, 54, 58 and therefore reduces wear and provides for smooth operation.

After the piston 51, 43, 54, 58 is mounted in the cylinder 20 (see FIG. 2), the piston delimits within the cylinder interior 25 a displacement chamber 15, the cylinder space at the opposite side of the piston which is delimited by the piston and the head member 21 of the cylinder being in communication with the ambient by the passages 24. When the piston is retracted that is moved out of the cylinder 20, it is disposed in the smaller diameter area of the cylinder interior. Then the piston is disposed outside the area of the groove 32. The inside wall 27 of the cylinder 20 is smooth in that area.

During the manual closing of the drawer 1 (FIG. 1), the gripper structures 4, 12 are engaged and/or the bolt 6 is engaged by the hook member 91 when it is released from the guide track 92 whereby the spring 5 pulls the drawer 1 toward a fully closed position while at the same time the deceleration and stop structure 10 abuts the stop element 14 so that the piston rod 41 is moved into the cylinder 20.

With a fast closing movement of the drawer 1 by an operator, the volume change of the displacement chamber 15 is greater than the air volume change caused by the air discharge via the gap at the piston seal element 61. The gas in the displacement chamber 15 is therefore compressed and the pressure in the displacement chamber 15 increases. This pressure is effective on the side of the displacement chamber 15 on the piston seal element 61 and presses the seal element outwardly against the cylinder wall 27. At the same time, the piston seal element 61 is pressed into engagement with the piston support structure 43. The air compressed in the displacement chamber 15 cannot escape. It generates a force opposing the closing movement of the drawer 1 so that the closing movement is slowed down. The plastic cylinder 20 may even be elastically widened.

When a small air volume escapes past the seal element 61 and the truncated cone shaped inner wall 27, the air pressure in the displacement chamber 15 is reduced and the counter force opposing the advance of the drawer becomes smaller. As the piston 51, 43, 54, 58 is moved by the remaining momentum of the drawer into the area of the throttling groove 32 whereupon the compressed air can flow past the piston seal element 61 through the throttling groove 32. The air pressure in the displacement chamber 15 becomes slightly smaller as a result. The piston seal element 61 slides now along the truncated cone-shaped inner wall 27 of the cylinder. When the piston 51, 43, 54, 58 has reached the second shorter groove 33, the air flow volume out of the compression space 15 is further increased. The second groove 33 is now also effective as a throttling passage. The air enclosed in the compression space can not be further compressed as the volume change equals about the air volume loss. Finally, the pressure in the compression space 15 approaches ambient air pressure. The piston seal element is no longer pressed against the cylinder wall and contracts so that it is disengaged from the truncated cam-shaped wall 27 of the cylinder 20. The momentum of the drawer 1 and its speed have been reduced so that the drawer is slowly moved to its end position where it remains at rest.

When the piston 51, 43, 54, 58 is moved out of the cylinder 20 air flows from the ambient around the piston seal element 61 and through the piston grooves 58 into the displacement chamber 15. The piston does not form a resistance so that essentially no pressure difference across the piston is built up and the seal element is not expanded. The piston is freely movable except for the friction developing at the piston rod guide opening 22.

The piston therefore is provided with a kind of releasable piston seal-check valve 61 which is controlled by the piston movement. When the piston is moved into the cylinder 20, the seal element 61 seals, when the piston is moved out of the cylinder air flow past the piston is unrestricted.

Figure 6:
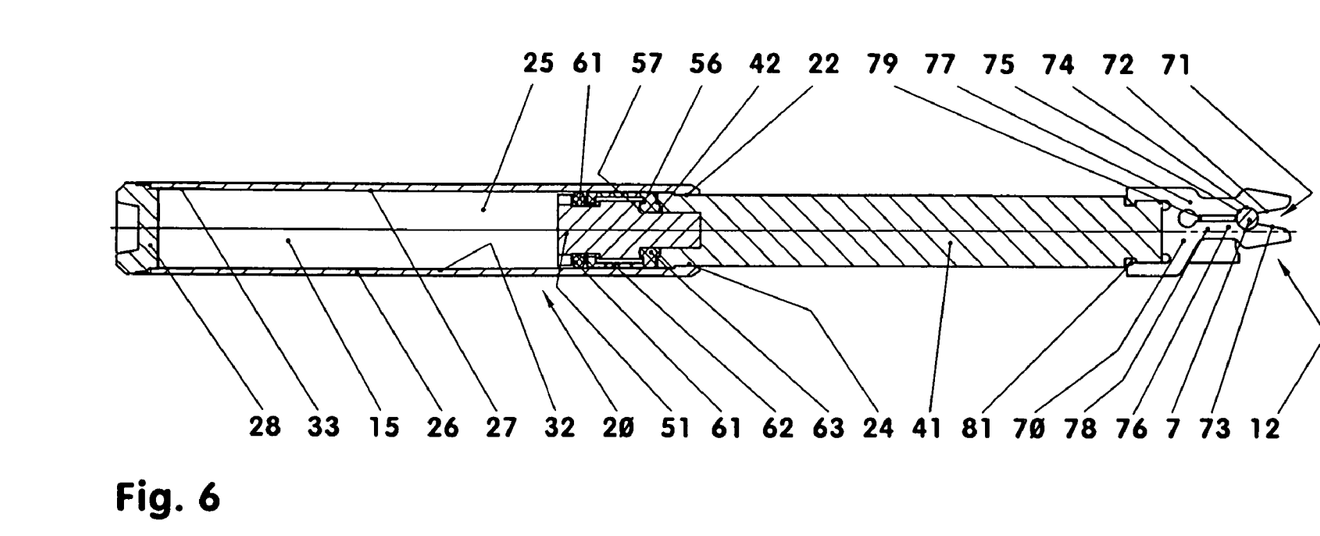
FIG. 6 shows the retarding or stop structure with an engagement member attached to the free end of the piston rod and with the piston including an additional seal element.

FIG. 6 shows an embodiment of a pneumatic retarding or stop arrangement with a piston seal element 61 and a serially arranged additional seal element 62 as well as a gripper element 12 in the form of a snap-coupling 70. In this embodiment, the deceleration or stop structure 10 is arranged for example at the support track 3 and the stop element 4 on the drawer 1 (FIG. 1).

The cylinder 20 has also in this case an inner truncated cone-shaped wall 27 which becomes wider in the direction of insertion of the piston rod 41. It also includes two throttling grooves 32, 33 of different length. The piston rod guide opening is for example annular.

The piston rod 41 (see FIG. 8) may also have for example the cross-sectional shape of a circle segment with a center angle of more than 180°. The area missing from the full-circle cross-section forms an air passage 24.

Figure 8:
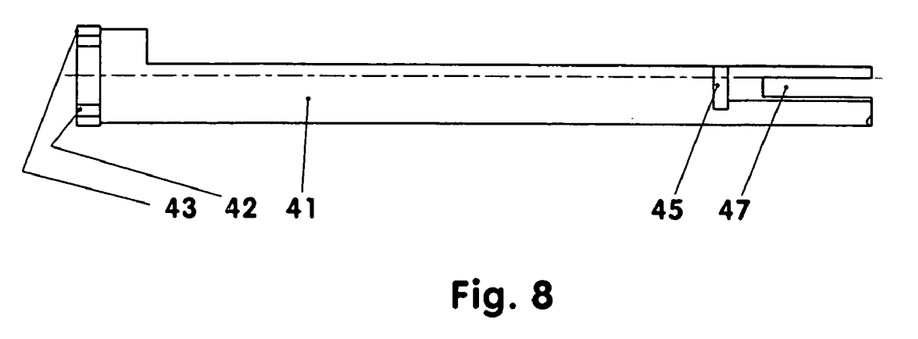
FIG. 8 shows the piston rod of the arrangement shown in FIG. 6.

The end of the piston rod adjacent the piston is provided on the piston support structure 43 with a groove 42.

A snap-in coupling 70 is mounted onto the free end of the piston rod 41 which engages the respective counter element 4 such as a bolt 7 of the drawer 1 (FIG. 6). The snap coupling 70 therefore is provided with a mouth area 71, a retaining area 74 and a flex area 76. The mouth area 72 includes an upper and a lower slide structure 72, 73, which encloses an acute angle for forming an insert wedge opening. In the retaining area 74, the upper and the lower slide structures 72, 73 form recesses 75 which are disposed opposite each other. The flex areas 76 are formed by the upper and the lower parts 77, 78 of the snap coupling 70, which are separated by a narrow gap 79. The wall thickness of the snap coupling 70 is smaller than in the mouth and retaining areas 71, 74. The gap 79 ends in a bore in order to avoid stress cracks.

When the drawer 1 approaches the deceleration and stop structure 10, the bolt 7 of the drawer 1 enters mouth area 71. The upper and lower parts 77, 78 of the snap coupling 70 are bent apart and the guide bolt 7 is engaged in the retaining area 74 of the snap-in coupling 70. When the drawer 1 is pulled out the bolt 7, the bolt bends the upper and lower parts 77, 78 of the snap in coupling 70 apart. As a result, the bolt is released.

For the mounting of the snap coupling 70 on the piston rod 41 (see FIGS. 6 and 8), the piston rod is provided with an eccentrically arranged longitudinal mounting groove 47 and retaining grooves 45 cut into the piston rod 41. The snap-in coupling 70 is provided with engagement clamping fingers 81, which are received in the retaining grooves 45 for locking the snap-in coupling to the piston rod 41.

Figure 7:
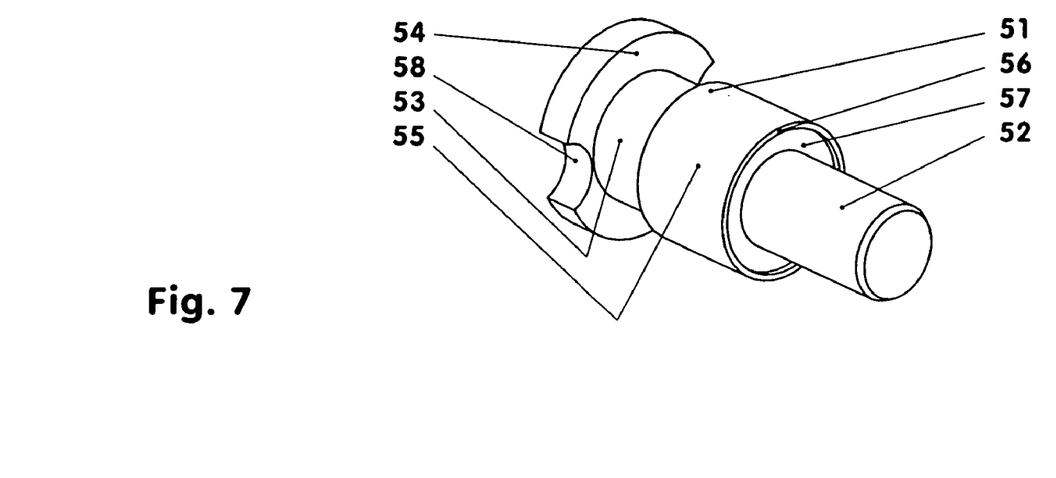
FIG. 7 shows the piston of the arrangement shown in FIG. 6.

The opposite end of the piston rod 41 is provided with a piston part 51 (see FIGS. 6, 7). The piston part has stepped diameter areas. A first area 52 with a diameter of about half the smaller inner diameter of the cylinder 20 is mounted with two thirds of its length on the piston rod 41. The diameter of the central area 55 of the piston part 51 is about one and a half time of the diameter of rod 41. The diameter of the central area 55 of the piston part 51 is about one and a half time of the diameter of the first part. At its end next to the piston rod 41, the front side 56 of the central area 55 includes an annular groove 57.

The diameter of another area of the piston part 51 is about 80% of the diameter of central area 55. This area is delimited by a piston support flange 54.

Figure 9:
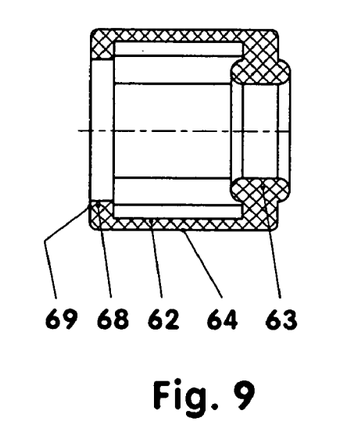
FIG. 9 is a cross-sectional view of the piston seal element of FIG. 6.
Figure 10:
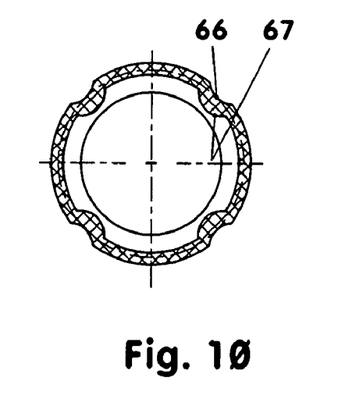
FIG. 10 shows the piston rod of FIG. 8 in cross-section.

Between the piston rod 41 and the piston part 51, a seal element 62, which is for example pot-shaped, is mounted form-fitted into the two annular grooves 57, 42, see FIGS. 9 and 10. The outer diameter of the seal element 62 corresponds for example to its axial length and is about 98% of the smaller inner diameter of the cylinder 20. Its wall thickness is about 3% of its outer diameter. The cylindrical outer surface is provided for example with four longitudinal grooves 66 having a depth of about 3% of the outer diameter of the seal element 62 so that these areas project inwardly from the sealing element 62 forming radial projections 67. The area opposite the engagement area 63 forms an inner annular flange 68 with an inner diameter of about 70% of the outer diameter of the seal element 62. The axially outer end of the seal element 62 forms the abutment surface 69.

This seal element 62 may also be without an engagement area 63. It would then have the shape of a sleeve, which abuts with one of its front faces the piston support surface 43.

Between the seal element 62 and the piston flange 54, the piston seal element 61 is arranged. It may be of the same design as the piston seal element 61 described in connection with FIG. 2. Also, the piston seal element 61 is radially movable relative to the piston part 51.

During assembly, the pot-shaped seal element 62 and the piston seal element 61 are placed onto the piston rod 41 and secured thereto such that the opening of the seal element 62 faces toward the piston seal element 61. The pot-shaped seal element 62 is radially movable relative to the piston part 51 except in the engagement area 63 wherein the projections 67 may abut the piston part. The projections 67 as a result provide for a uniform flow passage in the interior of the seal element 62. The piston rod 41 preassembled in this way is then inserted into the cylinder 20 and the bottom part 28 of the cylinder 20 is closed in this way. After the mounting of the snap-in coupling 70 onto the piston rod 41, the whole unit is installed in the guide system.

Instead of a pot-shaped seal element 62 and a piston seal element 61, a one-part seal element may be used. Such a seal element may be of similar design as the pot-shaped seal element 62, but includes additionally a radially outwardly projecting seal lip by which it is in contact with the cylinder wall 27.

When the piston rod 41 is moved out of the cylinder (see FIG. 6), the seal element 62 is not deformed and is not in contact with the cylinder wall 27. Outside the engagement area 63, the seal element 62 has radial play with regard to the piston part 51. The seal ring 61 is disposed for example axially movably between the abutment surface 69 and the piston flange 54 and abuts the inner cylinder wall 27.

Upon insertion of the piston rod 4 into the cylinder 20 the piston seal element 61 comes into contact with the inner cylinder wall 27 and abuts the pot-like seal element 62. The air in the displacement chamber is being compressed and presses the piston seal element 61 and the pot-like seal element 62 radially outwardly. The seal elements engage the cylinder wall 27 and dampen and decelerate the movement of the piston rod 41 additionally by the friction generated at the cylinder wall 27. As soon as the piston seal element 61 has reached the throttling groove 32, air is released from the displacement chamber 15 via the throttling groove 32 and the longitudinal grooves 66 to the ambient.

With increasing piston stroke, the area of the seal element in contact with the cylinder wall 27 becomes smaller. The radial force on the cylinder wall 27 generated by the compressed air becomes smaller and consequently also the piston deceleration caused by the friction. As soon as the piston seal element 61 has reached the throttling groove 33, additional air flows out of the displacement chamber 15 to the ambient via the throttling grooves 33, 32, 66, 24. The pressure in the displacement chamber 15 may suddenly collapse. The piston seal element 61 and the pot-like seal element 62 assume again their initial position they had before the beginning of the stroke movement. The drawer 1 then moves slowly and with little deceleration to its end position. There, it rests without rebound.

When the drawer is again pulled out, ambient air flows again into the displacement chamber 15 via the throttling passages 24, 66, 32, 33. The seal element 62 keeps its shape. It does not come into contact with the cylinder wall 27. The piston seal element abuts during the outward movement the piston flange 54 which includes grooves 58. During the outward movement, air flows from the ambient into the displacement chamber 15 in an unrestricted manner. The outward movement of the piston is essentially without resistance.

When the piston rod 41 is fully retracted, the snap coupling 70 is released in an essentially noiseless manner from the bolt 7. The deceleration and stop structure 10 is no longer engaged.

The cylinder 20 of the deceleration and stop structure 10 may includes not only conical spaces but also spaces of other shapes which are essentially constant at least over some of the length thereof. For example, a space with a relatively large-angle cone shape may change over to a space with a small cone angle. There may also be a conical space with a transition to a polygonal space. In this way different functions of the deceleration procedure may be generated by way of the stroke of the piston 51, 43, 54, 58.

The grooves, instead of being continuous longitudinal grooves 32, 33, may be interrupted grooves wherein each individual groove should be longer than the axial length of the piston. Also, one or more of the grooves may be formed into the inner wall 27 of the cylinder in a thread-like fashion. The grooves may have parallel edges or their width may change over their length. Also, the depth of the grooves may become larger toward the displacement chamber 15. Instead of grooves, the cylinder wall 27 may also be provided with one or several longitudinally extending ribs which define therebetween throttling passages.

The deceleration of the deceleration or stop structure may also be adjustable. To this end, the cross-section of the air flow passages 24 may be adjustable for controlling the flow of the air displaced from the displacement chamber 15.

The spring 5 may also be disposed in the cylinder 20. In that case, it would be a compression spring which would be arranged between the head member 21 of the cylinder 20 and the piston 51, 43, 54, 58. Then the extended piston rod 41 would be engaged and disengaged for example by means which are disposed within the cylinder 20 or outside the cylinder 20 and actuated for example by the drawer.

What is claimed is:

1. A guide system with a pneumatic stop structure (10), comprising a cylinder (20), a piston (51, 43, 54, 58) movably disposed in said cylinder (20), a piston rod (41) which is subjected to internal and external forces connected to said piston and extending from said cylinder (20) for providing a force in a direction opposite to the stroke movement of the piston, said piston including a piston seal element (61) and delimiting in said cylinder (20) a displacement chamber (15), flow passages (32, 33, 58) provided for controlling air flow past the piston (51) into and out of the displacement chamber (15) at a rate depending on the direction of movement of the piston (51, 43, 54, 58) in the cylinder (20), and said piston seal element (61) being in contact which the wall of the cylinder (20) when the piston is in a first end position in said cylinder (20) and the seal is not exposed to pressurized air, said cylinder (20) having a cross-section which steadily increases at least in predetermined areas along the axial length thereof from the first end position of the piston toward the opposite end of the cylinder so that in the largest cylinder cross-section area at said opposite end of the cylinder, the piston seal element (61) is not in sealing engagement with the cylinder wall when the piston is at said opposite end of the cylinder (20), the system further including an engagement element (6) for engagement with an energy storage member (5) which is released by the engagement action of the engagement element (6) and exerts a force in the direction of the external force for pulling the engagement element) toward its end position.

2. A guide system according to claim 1, wherein at least the surface areas of the piston seal element (61) which are in contact with the cylinder wail (27), include additional compounds chemically bound or physically attached to the seal element (61).

3. A guide system according to claim 2, wherein the additional compound comprises halogens.

4. A guide system according to claim 1, wherein the displacement chamber (15) is disposed in the cylinder (20) at the side of the piston (51, 43, 54, 58) remote from the piston rod (41).

5. A guide system according to claim 1, wherein in the end area of the cylinder including the displacement chamber (15) the inner cylinder wall (27) includes at least one throttling groove (33) which has an axial length of at least 5% of the piston stroke.

6. A guide system according to claim 5, wherein in the end position of the piston in the displacement chamber (15), the displacement chamber (15) is in communication with the ambient via the throttling groove (33).

7. A guide system according to claim 5, wherein the cylinder wall (27) includes outside the cylinder area with the smallest cross-section at least a second throttling groove (32) which has an axial length of at least 25% of the piston stroke.

8. A guide system according to claim 1, wherein the cylinder wall (27) is widened in the form of a truncated cone with a cone wall inclination of 1:50 to 1:250.

9. A guide section according to claim 3, wherein the piston seal element is a seal ring consisting of nitrile-butadiene rubber with halogens chemically bound to the surface of the seal ring.

10. A guide section according to claim 1, wherein the piston seal element (61) is part of a pot-shaped seal element (62) which is mounted to the piston (51, 43, 54, 58) and has an axial opening facing the displacement chamber (15).

11. A guide section according to claim 10, wherein the seal element (62) is provided at its outer circumferential surface with at least one longitudinal groove (66).

12. A guide section according to claim 10, wherein the axial length of the seal element (62) corresponds at least to its outer diameter.

13. A guide section according to claim 4, wherein the cylinder (20) of the stop structure (10) is provided with a piston rod guide opening (22) in which the piston rod (41) is slidably supported and air passages (24) are provided in the area of the piston rod guide opening (22).

* * * * *